United States Patent [19]

Hsu

[11] Patent Number: 4,907,325
[45] Date of Patent: Mar. 13, 1990

[54] BLIND TRIMMER

[76] Inventor: Pei H. Hsu, No. 373 Sec 4, Yen Hai Rd., Fu Nan Fu Shing, Chang Hua, Taiwan, Taiwan

[21] Appl. No.: 230,143

[22] Filed: Aug. 9, 1988

[51] Int. Cl.⁴ .......................... B23P 23/00; B23C 3/00
[52] U.S. Cl. .......................... 29/33 P; 29/561; 29/564; 83/404; 83/425.2; 83/435.1; 144/3 R; 409/138; 409/229
[58] Field of Search ............ 409/138, 228, 229; 29/33 P, 34 R, 561, 564, 566, 566.1, 33 R, 563; 83/404, 409, 425.2, 435.1, 437, 478; 144/3 R

[56] References Cited

U.S. PATENT DOCUMENTS

| | | | |
|---|---|---|---|
| 178,992 | 6/1876 | Burgher | 83/425.2 |
| 453,365 | 6/1891 | Barringer | 83/435.1 |
| 985,272 | 2/1911 | Miller | 409/228 |
| 1,007,355 | 10/1911 | Hoepfner | 29/561 |
| 1,308,733 | 7/1919 | Curle | 29/561 |
| 1,454,399 | 5/1923 | Norris | 83/409 |
| 1,461,919 | 7/1923 | La Malta | 83/425.2 |

Primary Examiner—Daniel Howell
Attorney, Agent, or Firm—Browdy & Neimark

[57] ABSTRACT

A blind trimmer includes a machine frame and an immovable as well as a movable trimming mechanisms respectively mounted on two longitudinal sides of the frame. Each trimming mechanism includes a plate, a saw, a cylindrical milling blade, and a clamping device having a slide piece which is slidable on the plate and spacedly mounts thereon two jaw members clamping therebetween a respective end portion of a collapsed blind so that the respective end portion will be trimmed by the saw when the slide piece is slid on the plate to let the respective end portion pass through the saw.

10 Claims, 3 Drawing Sheets

BLIND TRIMMER

BACKGROUND OF THE INVENTION

1. Field of the Invention

The present invention relates to a blind, and more particularly to a horizontal blind.

2. The Prior Art

Since the size of a window, or a door is not uniform, a window if it is to be equipped with a blind or a curtain, needs a specifically sized blind. If the size of the window is unique, then a custom-made blind is required. Normally, either a vertical blind or a horizontal one is relatively uniform in height and can relatively easily be adjusted in height. This is not necessarily the case with respect to the widths of the blinds.

For the consumer, "a custom-made blind" means that it is not readily available and is expensive and further means that it is not cost-effective and cannot be mass-produced by the manufacturer. For the dealer, a custom-made blind means that he must purchase blinds of various sizes which are put in his custody during sale which in turn raises the managing cost. The present invention has therefore tried to solve the above problems encountered by the prior art in the present invention.

SUMMARY OF THE INVENTION

It is therefore an object of the present invention to provide a blind trimmer capable of trimming the width of a blind.

It is additional an object of the present invention to provide a blind trimmer capable of overcoming problems caused by a custom-made blind.

It is further an object of the present invention to provide a blind trimmer capable of being used by a manufacturer or by a dealer to easily trim a blind to any desired width, so that the number of the sizes of the blinds the manufacturer must produce and the dealer must purchase is effectively reduced.

As shown in FIGS. 1–4, a horizontal blind 10 includes an upper piece 11, a lower piece 12, intermediate blind strips 13 and end cover pieces 14 and 15. It is very time-consuming or even impossible if one wants to trim the width of such blind 10 manually since he must symmetrically trim elements 11, 12 and 13 at both ends thereof one by one and thereafter round corners thereof accordingly. According to the present invention, the end covers 14 and 15 are removed from a collapsed blind 10 which then has an end portion thereof moved through a cutting member 17 to have an excess portion 16 cut off and then moved through a shaping member 18 to obtain rounded corners 19 for the end portions. Then the end covers 14 and 15 are put on.

The present invention may best be understood through the following description with reference to the accompanying drawings, in which:

DETAILED DESCRIPTION OF THE PREFERRED EMBODIMENT

Figure 1:
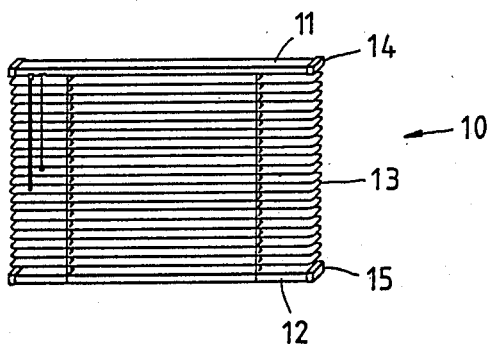
FIG. 1 is a perspective view showing a blind.
Figure 2:
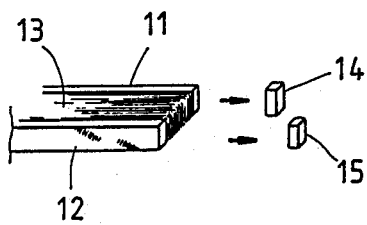
FIGS. 2–4 are segmentally perspective views schematically showing how a blind trimmer according to the present invention works.
Figure 3:
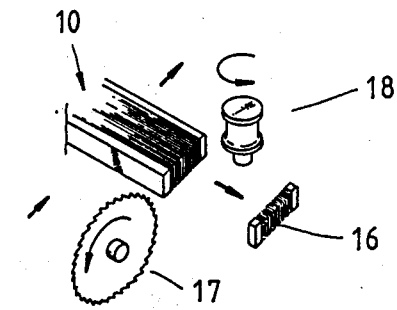
Figure 4:
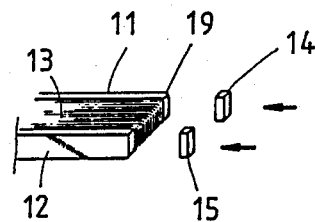
Figure 5:
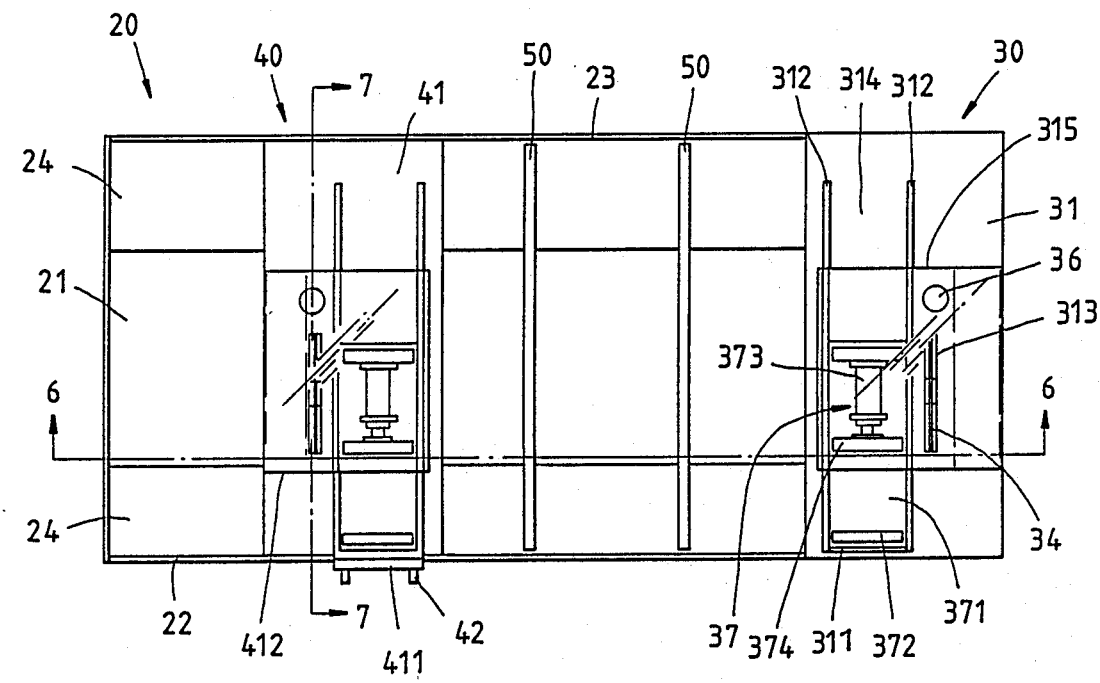
FIG. 5 is a top view showing a blind trimmer according to the present invention.
Figure 6:
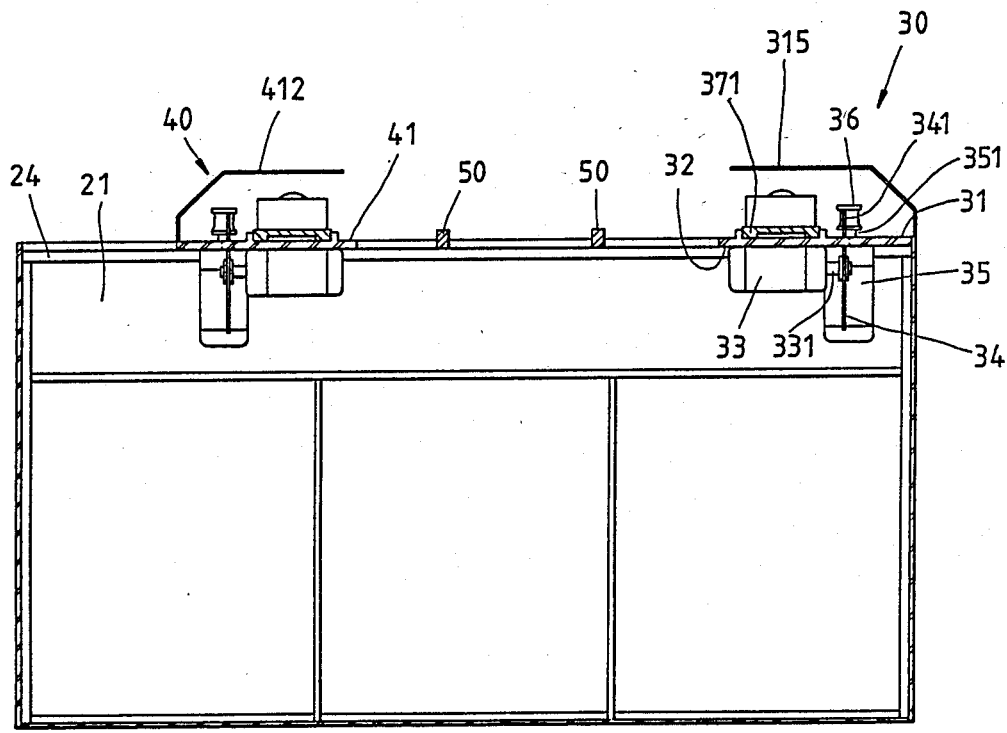
FIG. 6 is a sectional view taken along line 6—6 in FIG. 5.
Figure 7:
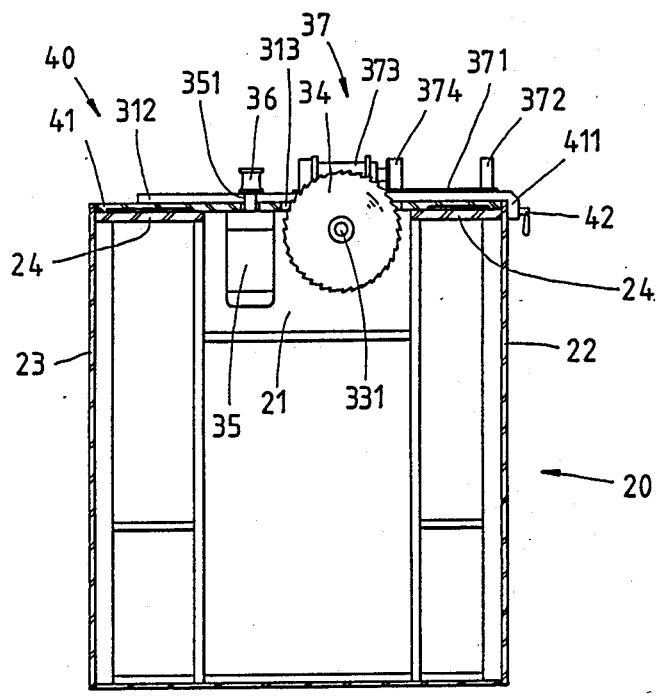
FIG. 7 is a sectional view taken along line 7—7 in FIG. 5.

Referring now to FIGS. 5–7, the present blind trimmer includes a machine frame 20 having two longitudinal sides 22, 23 respectively attaching at the top inner sides thereof two slide plates 24 forming a first longitudinal slideway having at the middle portion thereof a receiving space 21. A first trimming mechanism 30 is immovably fixed on the right side of frame 20, and a second trimming mechanism 40 is movably mounted on the left side of frame 20 so that the distance between mechanisms 30 and 40 can be adjusted.

Each trimming mechanism 30 (40) includes a plate 34 (41) a motor 33, a circular saw 34, a second motor 35, a cylindrical milling wheel 36, and a clamping device 37. Plate 31 (41) has a bottom 32 securing thereto the motor 33 having a shaft 331 parallel to plate 31 (41). The circular saw 34 is mounted on shaft 331 and has a portion 341 protruding through a slit 313 of plate 31 above plate 31. The second motor 35 is secured to bottom 32 and has a shaft 351 vertically projecting above plate 31 (41). The cylindrical milling wheel 36 is fixed to shaft 351 and has at least an arcuate shaping knife-edge for arcuately shaping an end edge of a respective end portion of a collapsed blind after it is trimmed by saw 34. The clamping device 37 includes a slide piece 371 slidable on a longitudinal slideway 314 of plate 31 formed by a transverse front stopper 311 and two guides 312 which is positioned inside of saw 34 and wheel 36 with respect to the first longitudinal slideway of frame 20. The device 37 further includes a first jaw member 372 fixed to slide piece 371, an air cylinder 373 secured to slide piece 371, and a movable jaw member 374 fixed to the spindle of cylinder 373 and capable of cooperating with member 372 to clamp therebetween a respective end portion of a collapsed blind so that the respective end portion will be trimmed by saw 34 when slide piece 371 is slid on slideway 314 to let the respective end portion pass through saw 34.

In order that second mechanism 40 is movably mounted on frame 20, plate 41 of mechanism 40 is slidably mounted on the slide plates 24 and front stopper 311 of plate 41 extended over the side wall 22 to form an extension 411 through which two bolts 42 can thread against side wall 22 for locking second mechanism 40 to frame 20. In order that a collapsed blind having respective end portions thereof clamped by respective mechanisms 30, 40 will not sag therebetween, two transverse supporting pieces 50 are movably and spacedly placed on slide plates 24 for supporting the blind at the intermediate portions thereof from thereunder. In order to protect or shield therein saws 34 and milling wheels 36, two pivotable transparent cover 315, 412 can be respectively mounted on mechanisms 30 and 40 and can be upwardly pivoted for cleaning mechanisms 30 and 40, if necessary.

Figure 8:
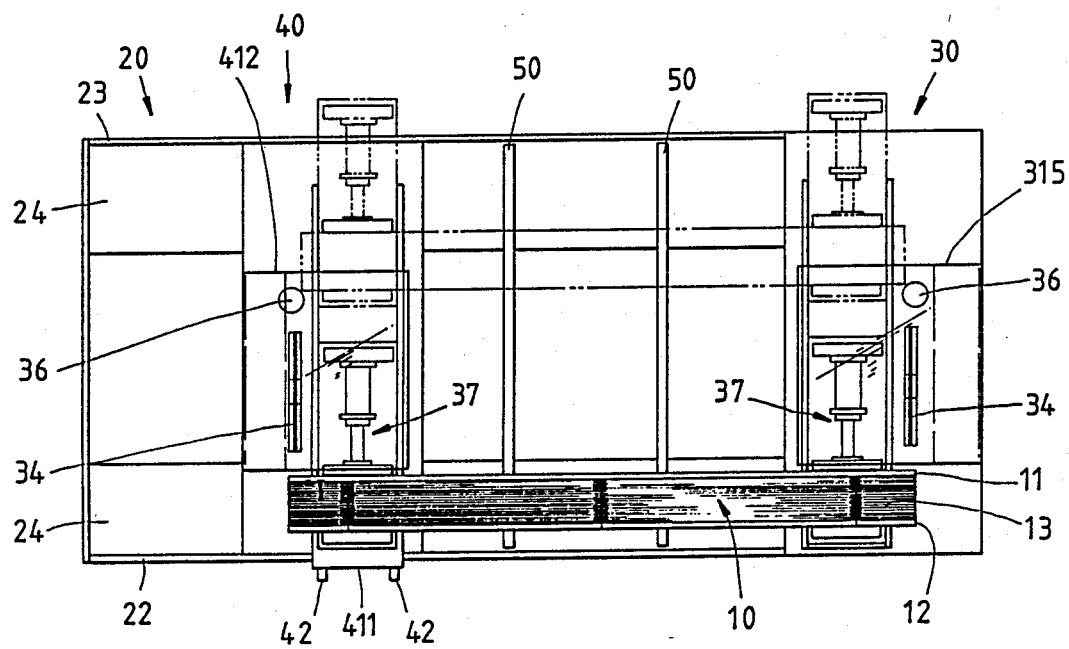
FIG. 8 is a schematic view showing how a blind trimmer in FIG. 5 works.

As schematically shown in FIG. 8, the operation of the present blind trimmer is as follows.

Having been collapsed together and end covers 14, 15 having been removed, the blind 10 has two end portions thereof respectively placed on clamping devices 37 of mechanisms 30 and 40. After plate 41 has been slid on slide plates 24 to a suitable position enabling blind 10 to be trimmed to have a desired width and bolts 42 have been threaded against side wall 22, cylinders 373 are actuated to have respective end portions of blind 10 clamped by respective clamping devices 37. Then, slide pieces 371 are slid respectively along slideways 314 perpendicular to the first slideway and thus respective end portions of blind 10 are moved across respective saws 34 to have the excess blind lengths thereof trimmed off. Thereafter, the trimmed respective blind end portions are further moved across respective milling wheels 36 to round off corners of blind 10. Finally, the blind 10, trimmed and rounded, is removed from clamping devices 37 to have end covers 14 and 15 put on and upper and lower pieces 11 and 12 of the blind 10 respectively.

The advantages achieved by the present blind trimmer can be summarized as follows.

1. Its operation is simple. It perfectly trims the blind since it trims the blind at both ends thereof and then rounds off corners of the trimmed ends so that the trimmed blind looks as if it were custom-made.

2. It presents an economic blind for the manufacturer, the dealer and the consumer.

Through the above description, it should now become readily apparent how and why the present invention can achieve the objects it contemplates.

What I claim is:

1. A blind trimmer comprising:
   a machine frame having thereon a first longitudinal slideway;
   a first trimming mechanism immovably fixed on a longitudinal side of said frame; and
   a second trimming mechanism movably mounted on said slideway at an opposite longitudinal side of said frame so that a distance between said first and second trimming mechanisms can be adjusted; and
   wherein each of said trimming mechanisms include:
   a plate mounted on said frame and having thereon a second longitudinal slideway perpendicular to said first longitudinal slideway;
   a saw capable of sawing in a direction parallel to said second slideway and mounted on said plate outside of said second slideway; and
   a clamping device including:
   a slide piece slidable on said second slideway; and
   two jaw members spacedly mounted on said slide piece and capable of clamping therebetween a respective end portion of a collapsed blind so that said respective end portion will be trimmed by said saw when said slide piece is slid on said second slideway to let said respective end portion pass through said saw.

2. A blind trimmer according to claim 1 wherein: each of said trimming mechanisms further includes a cylindrical milling wheel having at least an arcuate shaping knife-edge for arcuately shaping an end edge of said respective end portion after it has been trimmed by said saw, and mounted on said plate to have an axis perpendicular to said second slideway; and said trimmer further includes two motors respectively fixed to and under said plate and respectively having two shafts respectively securing thereto said saw and said cylindrical milling blade.

3. A blind trimmer according to claim 1 wherein said plate of said second mechanism is slidably mounted on said first slideway.

4. A blind trimmer according to claim 1 wherein: said saw is circular; and
   said plate includes a longitudinal slit to protrude thereon a portion of said saw from its bottom side thereof.

5. A blind trimmer according to claim 1 wherein:
   one of said jaw members is fixed on said slide piece;
   the other one jaw member is movable; and said slide piece secures thereon an air cylinder having a spindle attaching thereto said movable jaw member.

6. A blind trimmer according to claim 1, further comprising at least a supporting piece transversely mounted on said first slideway to prevent said collapsed blind having respective end portions thereof clamped by said respective trimming mechanisms from sagging.

7. A blind trimmer according to claim 1 wherein said each mechanism further includes a pivotable protective cover protecting and shielding therein said saw.

8. A blind trimmer according to claim 1 wherein said second slideway includes two side guides guiding therein said slide piece.

9. A blind trimmer according to claim 1, further comprising a locking device for locking said second trimming mechanism to said frame.

10. A blind trimmer according to claim 9 wherein:
    said plate of said second mechanism is slidably mounted on said first slideway; and
    said locking device is a bolt capable of threading through said plate and against said first slideway.

* * * * *